(12) United States Patent
Baker et al.

(10) Patent No.: US 9,819,462 B2
(45) Date of Patent: Nov. 14, 2017

(54) METHOD AND APPARATUS FOR SIGNALING TO SUPPORT FLEXIBLE REFERENCE SIGNAL CONFIGURATION

(75) Inventors: Matthew P J Baker, Canterbury (GB); Fang-Chen Cheng, Randolph, NJ (US); Sigen Ye, New Providence, NJ (US); Seau Sian Lim, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 13/361,122

(22) Filed: Jan. 30, 2012

(65) Prior Publication Data

US 2013/0195100 A1 Aug. 1, 2013

(51) Int. Cl.
*H04W 28/02* (2009.01)
*H04L 5/00* (2006.01)

(52) U.S. Cl.
CPC .......... *H04L 5/0048* (2013.01); *H04L 5/0094* (2013.01)

(58) Field of Classification Search
None
See application file for complete search history.

(56) References Cited

U.S. PATENT DOCUMENTS

| 2003/0076812 A1 | 4/2003 | Benedittis |
| 2010/0135242 A1* | 6/2010 | Nam ..................... H04L 5/0007 370/330 |
| 2011/0244877 A1* | 10/2011 | Farajidana ............ H04L 5/0023 455/452.2 |
| 2011/0250897 A1* | 10/2011 | Seo et al. ....................... 455/445 |
| 2011/0317581 A1* | 12/2011 | Hoshino et al. .............. 370/252 |
| 2013/0182799 A1* | 7/2013 | Geirhofer ............ H04W 56/00 375/340 |

FOREIGN PATENT DOCUMENTS

| CN | 1401197 A | 3/2003 |
| CN | 101572896 A | 11/2009 |
| CN | 102300244 A | 12/2011 |
| JP | 2008-172357 A | 7/2008 |
| JP | 2011-223111 A | 11/2011 |
| WO | WO-2010/107267 A2 | 9/2010 |
| WO | WO-2010106729 A1 | 9/2010 |
| WO | WO-2011/019230 A2 | 2/2011 |
| WO | WO-2011/047353 A1 | 4/2011 |
| WO | WO-2011/118965 A2 | 9/2011 |

OTHER PUBLICATIONS

"Additional carrier types—motivations and issues", 3GPP TSG RAN WG1 meeting #66bis, Zhuhai, China, Oct. 10-14, 2011, R1-112893.

(Continued)

*Primary Examiner* — Rhonda Murphy
(74) *Attorney, Agent, or Firm* — Harness, Dickey & Pierce, P.L.C.

(57) ABSTRACT

The method includes determining which of one or more physical resource elements are to include a reference signal. The method includes generating a signaling message including information indicating the determined physical resource elements that are to include a reference signal, and transmitting the signaling message to user equipment.

15 Claims, 7 Drawing Sheets

(56) References Cited

OTHER PUBLICATIONS

"Downlink reference signals for additional carrier types", 3GPP TSG RAN WG1 #67, San Francisco, USA, Nov. 14-18, 2011, R1-114091.
International Search Report dated Apr. 23, 2013 for related International Application No. PCT/US2013/023523.
3GPP TSG RAN WG1 Meeting #62, Madrid, Spain, Aug. 23-Aug. 27, 2010, "Resource Allocation and Signalling for Dynamic Aperiodic SRS in LTE-A", Research in Motion, UK Limited.
International Preliminary Report dated Aug. 14, 2014.
ZTE Corporation, Further investigation on CSI-RS design for LTE-Advanced, 3GPP TSG-RAN WG1#58b R1-093809, Oct. 12-16, 2009.

* cited by examiner

METHOD AND APPARATUS FOR SIGNALING TO SUPPORT FLEXIBLE REFERENCE SIGNAL CONFIGURATION

BACKGROUND OF THE INVENTION

Embodiments relate to signaling reference signals in a wireless network, for example, a Long Term Evolution (LTE) wireless network.

The 3GPP Long Term Evolution (LTE) represents a major advance in cellular technology. LTE is designed to meet carrier needs for high-speed data and media transport as well as high-capacity voice support well into the next decade. LTE encompasses high-speed data, multimedia unicast and multimedia broadcast services.

The LTE physical layer (PHY) is an efficient mechanism for conveying both data and control information between an enhanced base station (eNodeB) and mobile user equipment (UE). The LTE PHY employs some advanced technologies to cellular applications. These technologies include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier-Frequency Division Multiple Access (SC-FDMA) on the uplink (UL). OFDMA allows data to be directed to or from multiple users on a subcarrier-by-subcarrier basis for a specified number of symbol periods.

Existing carriers in LTE systems include Cell-Specific Reference Signals (CRS) in certain Resource Elements (REs) in every subframe.

In a recent LTE release, new types of carriers are to be introduced, one aim of which is to reduce overhead from non-data-bearing signals such as CRS. However, simply to omit the CRS is not necessarily possible, because the CRS may continue to be required for the UEs to make measurements (e.g. for monitoring of the serving radio link or for measuring interference in neighboring cells) and/or for the UEs to maintain synchronization.

Similar issues exist with the Channel State Information Reference Signals (CSI-RS). Although the CSI-RS are not transmitted in every subframe (unlike the CRS), they are nonetheless transmitted using the full system bandwidth and with a periodicity which is configured semi-statically (i.e. cannot be modified dynamically). Reducing the bandwidth of the reference signals would also have the advantage of enabling the transmission bandwidth of the carrier to be better matched to the bandwidth that may be available.

Solutions have been proposed where the CRS and/or CSI-RS may be transmitted only in certain resource blocks or only in certain subframes. The solution is to signal a bandwidth over which UEs are expected to make measurements (known as the "set S" subbands). However, the details of the signaling have not been proposed. Moreover, signaling the subbands for measurements is not sufficient, because even UEs which have no measurements configured are required to know in which PRBs the reference signals are present, for synchronization/tracking purposes.

A further shortcoming of the aforementioned solution is that the CSI-RS are configured with a periodicity and a time offset. However, simply reconfiguring the periodicity may not provide sufficient flexibility. For example, short regular bursts of a few subframes in which reference signals are provided, with no reference signals in the subframes between the bursts, may be a useful configuration for making measurements.

A fully flexible approach, with a complete 2-dimensional bit-map of, for example, 110 RBs in the frequency domain and 40 subframes in the time domain, thus including 4400 bits, is impractical and itself constitutes a higher overhead which would make it prohibitive to adapt the reference signal pattern.

Example embodiments provide a method and apparatus to reduce overhead but do not remove required reference signals.

SUMMARY OF THE INVENTION

One embodiment includes a method for signaling a reference signal. The method includes determining which of one or more physical resource elements are to include a reference signal. Generating a signaling message including information indicating the determined physical resource elements that are to include a reference signal, and transmitting the signaling message to user equipment.

Another embodiment includes a method for using a reference signal. The method includes receiving a signaling message including information indicating which of a plurality of physical resource elements include the reference signal, and using the reference signal in at least one of the indicated physical resource elements for at least one of detection, synchronization and measurements of a carrier.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

As used herein, the term "mobile unit" may be considered synonymous to, and may hereafter be occasionally referred to, as a client, user equipment, mobile station, mobile user, mobile, subscriber, user, remote station, access terminal, receiver, etc., and may describe a remote user of wireless resources in a wireless communication network.

Similarly, as used herein, the term "evolved Node B" or "eNodeB" may be considered synonymous to, and may hereafter be occasionally referred to, as a Node B, base station, base transceiver station (BTS), etc., and may describe a transceiver in communication with and providing wireless resources to mobiles in a wireless communication network which may span multiple technology generations. As discussed herein, base stations may have all functionally associated with conventional, well-known base stations in addition to the capability to perform the methods discussed herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits (ASIC), field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Figure 1:
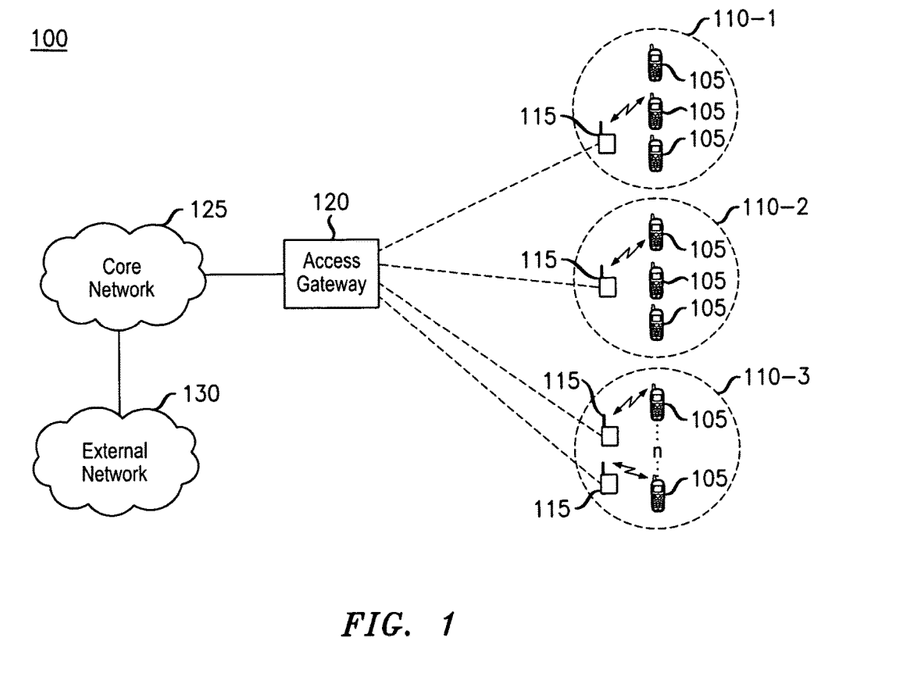
FIG. 1 illustrates a block diagram of a wireless communication network according to example embodiments.

FIG. 1 illustrates a wireless communication network 100 that includes an access gateway 120 having one or more associated eNodeBs 115. The access gateway 120 is communicatively coupled to a core network (CN) 125 that is, in turn, communicatively coupled to one or more external networks 130, such as the Internet or other packet data networks. Based on this arrangement, the network 100 communicatively couples user equipment (UE) 105 to each other and/or to other user equipment or systems accessible via the external networks 130. The access gateway 120 coverage area may include a plurality of cells 110-1, 110-2, 110-3.

The wireless communication network 100 may be an Evolved Universal Terrestrial Radio Access Network (E-UTRAN). Long Term Evolution (LTE) is the name given to a project to improve the Universal Mobile Telecommunications System (UMTS) standard to cope with future requirements. In one aspect, UMTS has been modified to provide for the E-UTRAN as a fourth generation (4G) wireless network.

An E-UTRAN may include eNodeBs 115, which provide the Evolved Universal Terrestrial Radio Access (E-UTRA) user plane (PDCP/RLC/MAC/PHY) and control plane (RRC) protocol terminations with a user equipment (UE) 105. The eNodeBs may be interconnected with each other by an X2 interface.

As discussed herein, eNodeB 115 refers to a base station that provides radio access to UEs 115 within a given coverage area (e.g., TA 110-1, 110-2, 110-3). This coverage area is referred to as a cell. However, as is known, multiple cells are often associated with a single eNodeB.

As is known, the access gateway 100 controls, inter alia, user radio access network (RAN) mobility management procedures and user session management procedures.

For example, the access gateway 100 controls a UEs 105 tracking and reachability. The access gateway 100 also controls and executes transmission and/or retransmission of signaling messages such as paging messages for notifying destination UEs 105 of impending connection requests (e.g., when UEs 105 are being called or when network initiated data intended for the UE 105 is coming).

When the access gateway 120 is notified of a connection request for a UE 105, the access gateway 120 sends a paging message to each eNodeB 115 within the UE's tracking area. In response to receiving the paging messages, the eNodeBs 115 broadcast the paging messages on a slower signaling control channel such as the Paging Control Channel (PCCH) or Broadcast Control Channel (BCCH). These control channels broadcast the signaling messages to the entire coverage area of the cell. Conventionally, the slower signaling control channels are used because the data rate is limited for UEs 105 near edges of cells due to their distance, inter-cell interference, as well as the use of lower code rate and lower level of modulation (e.g., quadrature phase shift keying (QPSK)).

Further, once a UE 105 is notified of an incoming connection request (via a paging message), the UE 105 and the radio access network (RAN) exchange messages to setup a connection with an evolved packet system (EPS) default bearer. The EPS default bearer is normally a best effort Internet Protocol (IP) connection. The actual IP services requested (e.g., for a voice call over IP) are communicated only after setting up the initial connection. The specific application(s) involved are then started and their associated dedicated EPS bearers with specific quality of service (QoS) are established. In this instance, some undesirable delay exists and impacts the wireless user's experience for both the calling user and the called user.

Figure 2:
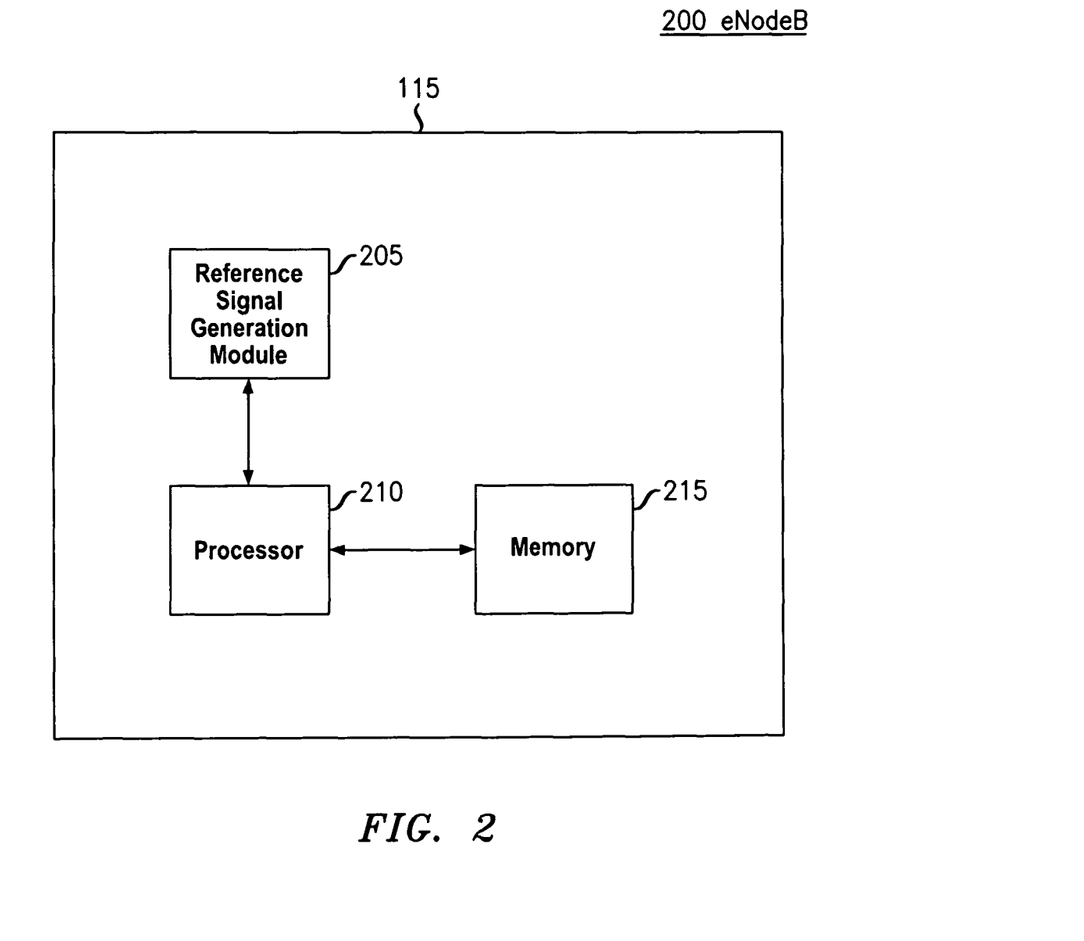
FIG. 2 illustrates an evolved Node B (eNodeB) according to an example embodiment.

FIG. 2 illustrates an evolved Node B (eNodeB) according to an example embodiment. As shown in FIG. 2, the eNodeB 115 includes, at least, a reference signal generation module 205, a processor 210 and a memory 215. The processor 210 and the memory 215 are known to those skilled in the art and will not be discussed further for the sake of brevity. The reference signal generation module 205 may be a software module, an application specific integrated circuit (ASIC) and/or any combination thereof.

The reference signal generation module 205 may be configured to determine which of a plurality of physical resource elements (PRE) associated with a physical resource block (PRB) are to include a reference signal. The reference signal generation module 205 may be further configured to generate a signaling message. The signaling message may include information indicating the determined PRE(s). Further details regarding the operation of the eNodeB 115 are discussed below with regard to FIG. 4.

Figure 3:
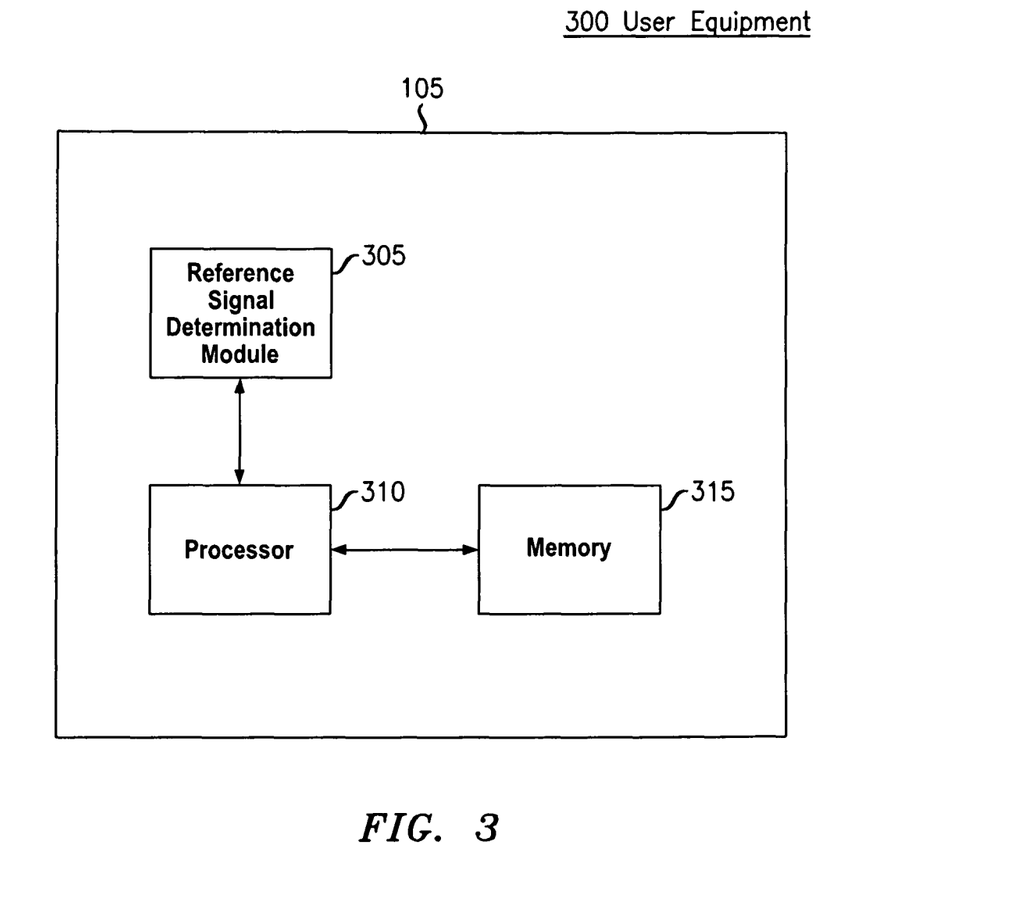
FIG. 3 illustrates a user equipment (UE) according to an example embodiment.

FIG. 3 illustrates a user equipment (UE) according to an example embodiment. As shown in FIG. 3, the UE 105 includes, at least, a reference signal determination module 305, a processor 310 and a memory 315. The processor 310 and the memory 315 are known to those skilled in the art and will not be discussed further for the sake of brevity. The reference signal determination module 305 may be a software module, an application specific integrated circuit (ASIC) and/or any combination thereof.

The reference signal determination module 305 may be configured to receive a signaling message including information indicating which of a plurality of physical resource elements (PRE) include a reference signal. The reference signal determination module 305 may be configured to use the reference signal in at least one of the indicated physical resource elements for at least one of detection, synchronization and measurements of a carrier. Further details regarding the operation of the UE 105 are discussed below with regard to FIG. 5.

According to example embodiments, signaling is used to inform the UEs as to which resource elements (RE) in a physical resource block (PRB), and which PRBs, contain reference signals. The signaling message (see FIGS. 7A-C described in more detail below) may include a number n1 of frequency-domain bitmaps to indicate which REs and/or PRBs in the frequency domain contain reference signals, and a further time-domain symbol map comprising n2 symbols to indicate which subframes contain reference signals and which of the said n1 frequency-domain bitmaps is applicable in each subframe. The number of bits per symbol in the time-domain symbol map is substantially equal to, for example $[\log_2(n_1+1)]$, and n2 may be greater than or significantly greater than n1.

The signaling may be broadcast, or UE-specific (dedicated). According to example embodiments the number of different frequency-domain configurations of the reference signals may be minimal. However, in the time domain, it may be useful to provide significantly more flexibility, in order to adapt to traffic loading and interference coordination with neighboring cells, as well as allowing energy saving at the base station.

Example embodiments further provide dynamic RS resource allocation for timing, synchronization, Channel State Information (CSI), Radio Resource Management (RRM), and Radio Link Monitoring (RLM) measurements.

One embodiment includes a method for signaling a reference signal. The method includes determining which of one or more physical resource elements and/or PRBs are to include a reference signal. Generating a signaling message including information indicating the determined physical resource elements and/or PRBs that are to include a reference signal, and transmitting the signaling message to user equipment.

Figure 4:
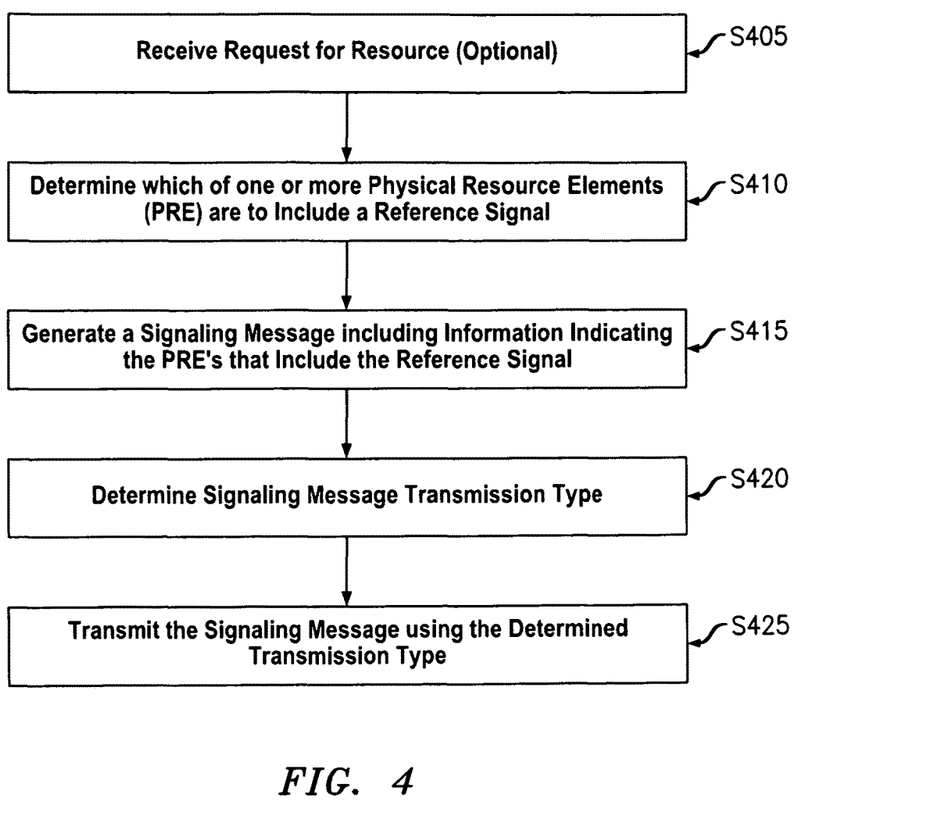
FIG. 4 illustrates a method of signaling a reference signal according to an example embodiment.

FIG. 4 illustrates a method of signaling a reference signal according to an example embodiment. While describing the steps of the method associated with FIG. 4, reference will be made to the network of FIG. 1 and the eNodeB 115 of FIG. 2.

In step S405 the reference signal generation module 205 receives a request for resources. For example, a user equipment (e.g., UE 105) may use a known method to request to join a wireless network (e.g., wireless communication network 100). Alternatively, a user equipment (e.g., UE 105) may use a known method to request additional resources from a wireless network (e.g., wireless communication network 100). Further, step S405 is an optional step the result of which is discussed in more detail below.

In step S410 the reference signal generation module 205 determines which of one or more physical resource elements (PRE) are to include a reference signal. For example, referring to FIG. 6 each of the blocks in the grid may represent a single PRE. The PREs in one slot over 12 subcarriers are collectively known in the art as a physical resource block (PRB). Returning to step S410, the reference signal generation module 205 may select a single PRE. For example, the reference signal generation module 205 may select the PRE indicated by an 'A' in FIG. 6 as the PRE to include the reference signal. Alternatively, the reference signal generation module 205 may select a PRE in each slot indicated with an 'X' in FIG. 6 as the PREs each including a reference signal.

Figure 6:
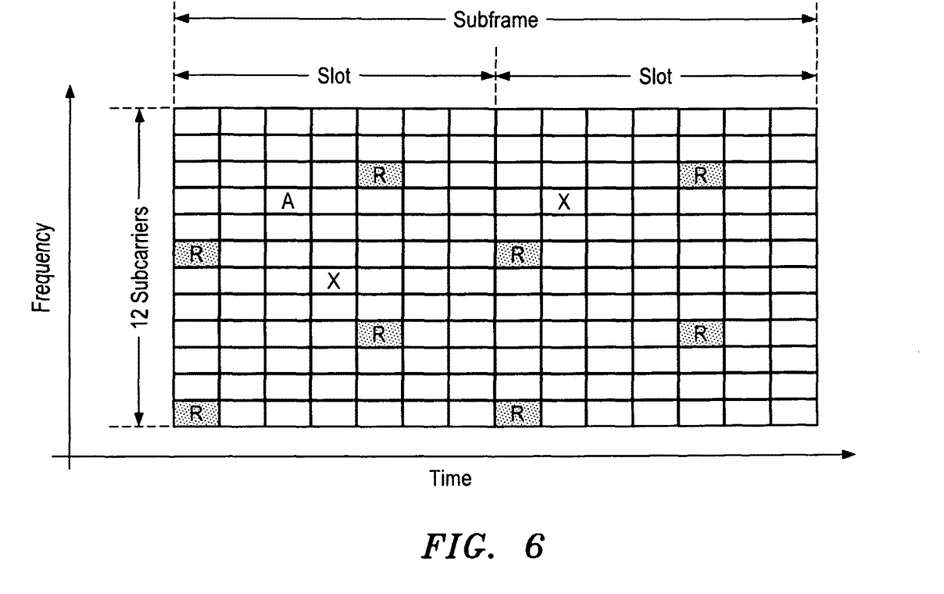
FIG. 6 illustrates reference signals interspersed among resource elements.

Although two examples were described for selecting PREs to include a reference signal, example embodiments are not limited thereto. Any number of or combination of PREs may be selected to include a reference signal. However, the number of PREs selected may be minimized. Further, a single PRE may be selected as associated with more than one PRB.

In step S415 the reference signal generation module 205 generates a signaling message. The signaling message may include information indicating the PRE(s) and/or PRBs that include the reference signal. The signaling message is described in more detail below with regard to FIGS. 7A-C.

In step S420 the reference signal generation module 205 determines a signaling message transmission type or mode. For example, the signaling message transmission type or mode may be a dedicated mode or a broadcast mode. For example, if the request for resources (described above with regard to step S405) may be associated with a configuration of the carrier for the UE, the transmission type or mode may be a dedicated mode along with the carrier configuration signaling information for the UE to detect the carrier (e.g., during a UE logon). For example, the eNodeB 115 may be configured to broadcast the signaling message (e.g., broadcast mode) at a fixed and/or alternatively predetermined time interval. If the eNodeB 115 is in a broadcast mode, step S405 may not be necessary.

In step S425 the reference signal generation module 205 transmits the signaling message using the determined transmission type. The reference signal generation module 205 may transmit the signaling message via the eNodeB (e.g., using an over the air interface) using a method known to those skilled in the art. Therefore, transmitting the signaling message will not be described further for the sake of brevity.

As one skilled in the art will appreciate, the method steps described above with regard to FIG. 4 may be performed in a variety of orders and not necessarily in the order described above. For example, step S420 may be the first step, or, alternatively step S410 may be the first step, or, alternatively step S415 may be the first step. Further, the method described above with regard to FIG. 4 may be executed as software on one or more processors associated with a eNodeB and/or using an application specific integrated circuit (ASIC) and/or any combination thereof.

One embodiment includes a method for using a reference signal. The method includes receiving a signaling message including information indicating which of a plurality of physical resource elements include the reference signal, and using the reference signal in at least one of the indicated physical resource elements for at least one of detection, synchronization and measurements of a carrier.

Figure 5:
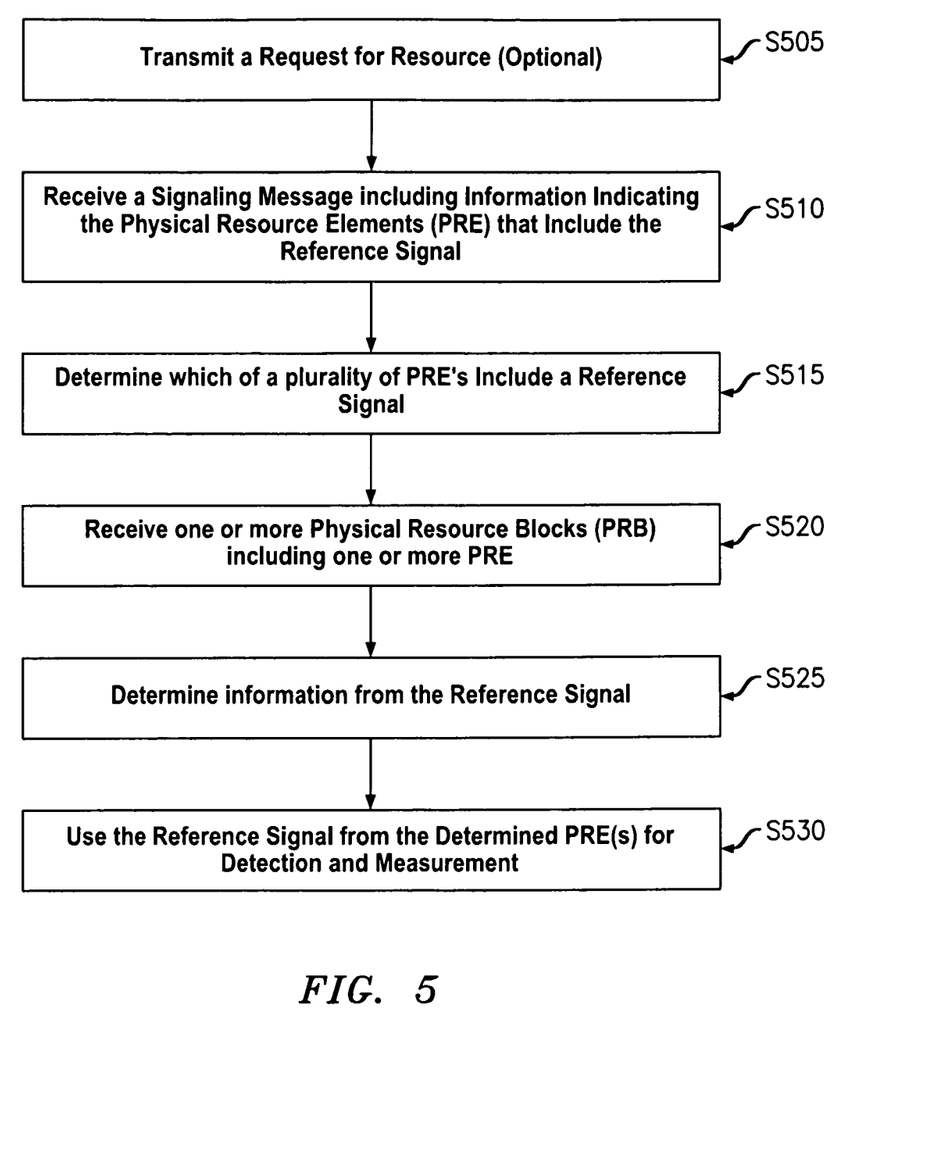
FIG. 5 illustrates a method of using a reference signal according to an example embodiment.

FIG. 5 illustrates a method of using a reference signal according to an example embodiment. While describing the steps of the method associated with FIG. 5, reference will be made to the network of FIG. 1 and the UE 105 of FIG. 3.

In step S505 the processor 310 transmits a request for resources. For example, the processor 310 may use a known method to request to join a wireless network (e.g., wireless communication network 100). Alternatively, the processor 310 may use a known method to request additional resources from a wireless network (e.g., wireless communication network 100).

In step S510 the reference signal determination module 305 receives a signaling message. The signaling message may include information indicating the physical resource blocks (PRB) that include a reference signal. The signaling message is described in more detail below with regard to FIGS. 7A-C.

In step S515 the reference signal determination module 305 determines which of one or more PRE(s) include the reference signal. For example, the reference signal determination module 305 may determine the PRE indicated by an 'A' in FIG. 6 as the PRE to include the reference signal. Alternatively, the reference signal determination module 305 may determine the PRE in each slot indicated with an 'X' in FIG. 6 as the PREs each including a reference signal. The determination is based on the signaling message which is described in more detail below with regard to FIGS. 7A-C.

In step S520 the processor 310 receives one or more PRB's. Receiving PRB's is known to those skilled in the art and will not be described in more detail for the sake of brevity.

In step S525 the reference signal determination module 305 determines information from the reference signal. For example, the reference signal determination module 305 may determine carrier offset estimates, channel estimation values and time/frequency synchronization values and the like from the reference signal.

In step S530 the processor 310 uses the reference signal from the determined PRE. For example, the processor 310 may use the carrier offset estimates, channel estimation values and time/frequency synchronization values and the like from the reference signal. The processor 310 may use the carrier offset estimates, channel estimation values and time/frequency synchronization values for detection and measurements of a carrier (e.g., carriers in LTE systems as described above in more detail with regard to FIG. 1).

As one skilled in the art will appreciate, the method steps described above with regard to FIG. 5 may be performed in a variety of orders and not necessarily in the order described above. Further, the method described above with regard to FIG. 5 may be executed as software on one or more processors associated with a user equipment and/or using an application specific integrated circuit (ASIC) and/or any combination thereof.

FIG. 6 illustrates reference signals interspersed among resource elements in a pair of PRBs. According to example embodiments, using the methods described above with regard to FIGS. 4 and 5, reference signals may be transmitted during any OFDM symbols. Further, FIG. 6 shows eight resource elements (indicated by an 'R' being used for reference signals in the pair of PRBs. By contrast, according to example embodiments, a variable number of resource elements, even as few as one resource element, may be used in a pair of PRBs allowing a greater number of the resource elements to be used for voice/data traffic.

Figure 7A:
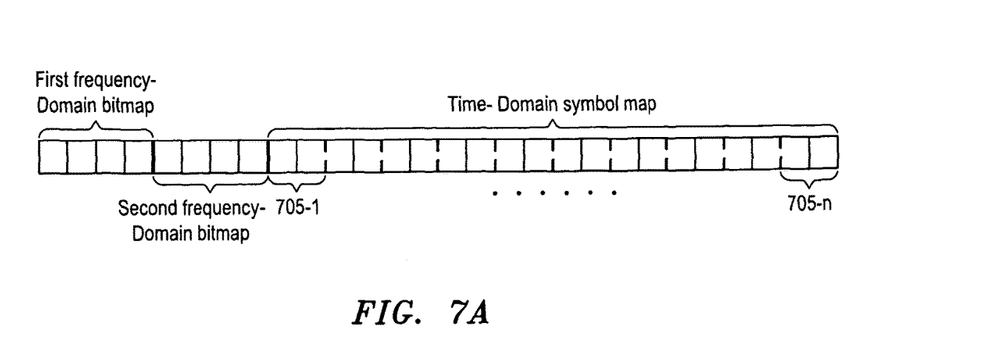
FIGS. 7A-C illustrates a signaling message according to an example embodiment.
Figure 7B:
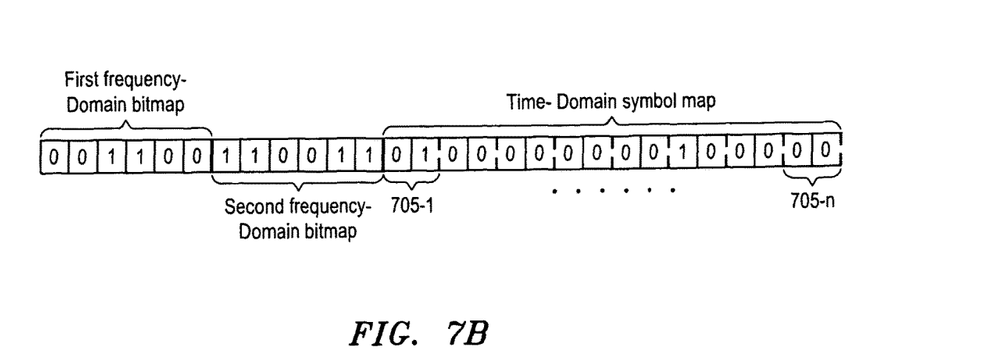
Figure 7C:
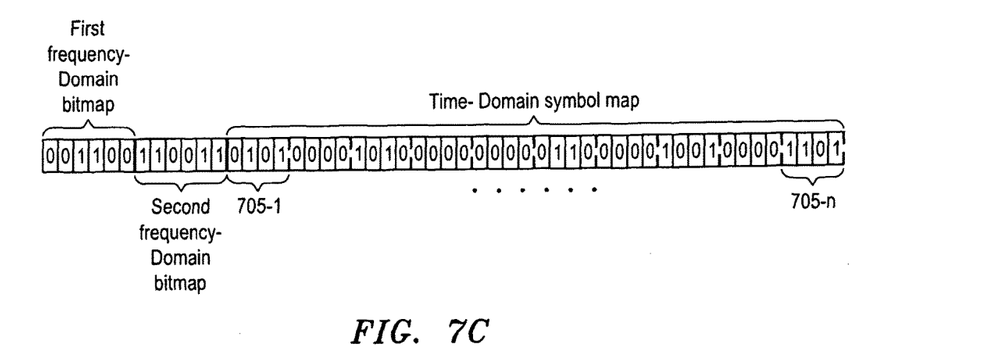

FIGS. 7A-C illustrate a signaling message according to an example embodiment. As shown in FIG. 7A, the signaling message includes one or more frequency bitmaps (e.g., first frequency domain bitmap and second frequency domain bitmap) and a time-domain symbol map including one or more symbols 705-1 to 705-n.

According to example embodiments each bit in the frequency-domain bit-maps (e.g., first frequency domain bitmap and second frequency domain bitmap) may correspond to one PRB or to multiple PRBs (e.g., a subband). For example, one of the bits in the frequency domain bitmap may include a bit corresponding to a first PRB (or group of PRBs) in the frequency domain. For example, a value of 0 may indicate that the PRB (or group of PRBs) does not contain reference signals. A value of 1 may indicate that the PRB (or group of PRBs) does contain reference signals.

Symbols 705-1 to 705-n may include one symbol corresponding to one subframe. For example, the symbol 705-1 to 705-n may include two bits. For example, a value of 00 may indicate that the corresponding subframe contains no reference signals. A value of 01 may indicate that the corresponding subframe contains reference signals in the PRBs (or groups of PRBs) for which the associated bit in the first frequency-domain bit-map is set to 1. A value of 10 may indicate that the corresponding subframe contains reference signals in the PRBs (or groups of PRBs) for which the associated bit in the second frequency-domain bit-map is set to 1.

For example, FIG. 7B shows a signaling message according to an example embodiment with 6 PRBs in the frequency domain across the system bandwidth. It has been determined that reference signals will be provided in RE indicated by an 'A' in only the central 2 PRBs in some subframes and in the outer PRBs in other subframes, and thus two frequency-domain bitmaps are provided. The time-domain bitmap is configured to indicate that subframe numbers 0 and 5 contain reference signals, using the first and second frequency domain bitmaps respectively.

Further, according to example embodiments, additional bits may be included in the frequency-domain bit-maps or in the symbols of the time-domain bit-maps to indicate different frequency-domain configurations for different types of reference signals. For example, two additional bits per symbol in the time-domain bit-map may be used to indicate whether the indicated frequency-domain pattern for that subframe applies to Cell-Specific Reference Signals (CRS) or Channel State Information Reference Signals (CSI-RS) or both, as shown in the example in FIG. 7C, where the time-domain bitmap is configured to indicate that subframe numbers 0 and 5 contain CRS (indicated by 01 in the first two bits of the corresponding symbols), subframe numbers 2 and 7 contain CSI-RS (indicated by 10 in the first two bits of the corresponding symbols), and subframe number 9 contains both CRS and CSI-RS.

Alternatively, the use of two bits per PRB or group of PRBs in the frequency-domain bitmap could be used to indicate whether the PRB or group of PRBs contains no reference signals, CRS, CSI-RS or CRS+CSI-RS.

Although the above example embodiments describes the steps as being performed by the network entities illustrated in FIG. 1, example embodiments are not limited thereto. For example, the above steps (regarding the method steps of FIGS. 3-4) may be performed by alternative network components.

Alternative embodiments of the invention may be implemented as a computer program product for use with a computer system, the computer program product being, for example, a series of computer instructions, code segments or program segments stored on a tangible or non-transitory data recording medium (computer readable medium), such as a diskette, CD-ROM, ROM, or fixed disk, or embodied in a computer data signal, the signal being transmitted over a tangible medium or a wireless medium, for example, microwave or infrared. The series of computer instructions, code segments or program segments can constitute all or part of the functionality of the methods of example embodiments described above, and may also be stored in any memory device, volatile or non-volatile, such as semiconductor, magnetic, optical or other memory device.

While example embodiments have been particularly shown and described, it will be understood by one of ordinary skill in the art that variations in form and detail may be made therein without departing from the spirit and scope of the claims.

The invention being thus described, it will be obvious that the same may be varied in many ways. Such variations are not to be regarded as a departure from the invention, and all such modifications are intended to be included within the scope of the invention.

We claim:

1. A method for signaling a reference signal, the method comprising:
   determining which of a plurality of physical resource elements associated with a physical resource block are to include the reference signal such that a variable number or combination of one or more physical resource elements of the physical resource block are determined from any of the plurality of physical resource elements to include the reference signal without any restriction on a position of the one or more physical resource elements within the physical resource block;

generating a signaling message including information indicating the variable number or combination of the one or more physical resource elements of the physical resource block that are determined from the plurality of physical resource elements to include the reference signal, wherein the signaling message includes, one or more frequency-domain bitmaps corresponding to the physical resource block and indicating which of the plurality of physical resource elements associated with the physical resource block will contain the reference signal, and a time-domain symbol map including one or more symbols corresponding to one or more subframes and indicating (i) which of the one or more subframes will contain the reference signal, and (ii) which frequency-domain bitmap of the one or more frequency-domain bitmaps is applicable in each subframe of the one or more subframes; and transmitting the signaling message to at least one user equipment to inform the at least one user equipment as to which of the plurality of physical resource elements associated with the physical resource block will contain the reference signal.

2. The method of claim 1, wherein the one or more physical resource elements are associated with one or more physical resource blocks.

3. The method of claim 2, wherein the one or more frequency-domain bitmaps correspond to the one or more physical resource blocks and indicate which of the one or more physical resource blocks will contain the reference signal.

4. The method of claim 3, wherein each respective frequency-domain bitmap of the one or more frequency domain bitmaps further indicates to which of one or more types of reference signals the respective frequency-domain bitmap applies for each subframe of the one or more subframes.

5. The method of claim 1, wherein at least one of (i) the one or more frequency-domain bitmaps and (ii) the one or more symbols of the time-domain symbol map indicate different frequency-domain configurations for different types of reference signals.

6. The method of claim 5, wherein each respective frequency-domain bitmap of the one or more frequency-domain bitmaps further indicates to which of one or more types of reference signals the respective frequency-domain bitmap applies for each subframe of the one or more subframes.

7. The method of claim 1, wherein each respective frequency-domain bitmap of the one or more frequency-domain bitmaps further indicates to which of one or more types of reference signals the respective frequency-domain bitmap applies for each subframe of the one or more subframes.

8. The method of claim 1, further comprising:
determining a mode associated with transmission of the signaling message, wherein the determined mode is one of a broadcast mode and a dedicated mode; and
transmitting the signaling message to the at least one user equipment using the determined mode.

9. A method for using a reference signal, the method comprising:
receiving a signaling message including information indicating which of a plurality of physical resource elements associated with a physical resource block are to include the reference signal, wherein a variable number or combination of one or more physical resource elements of the physical resource block are determined from any of the plurality of physical resource elements to include the reference signal without any restriction on a position of the one or more physical resource elements within the physical resource block, wherein the signaling message includes, one or more frequency-domain bitmaps corresponding to the physical resource block and indicating which of the plurality of physical resource elements associated with the physical resource block will contain the reference signal, and a time-domain symbol map including one or more symbols corresponding to one or more subframes and indicating (i) which of the one or more subframes will contain the reference signal, and (ii) which frequency-domain bitmap of the one or more frequency-domain bitmaps is applicable in each subframe of the one or more subframes;

determining the variable number or combination of the one or more physical resource elements that will contain the reference signal based on the signaling message; and using the reference signal contained in at least one of the one or more physical resource elements for at least one of detection, synchronization and one or more measurements of a carrier.

10. The method of claim 9, wherein the one or more physical resource elements are associated with one or more physical resource blocks, and the one or more frequency-domain bitmaps correspond to the one or more physical resource blocks and indicate which of the one or more physical resource blocks will contain the reference signal.

11. The method of claim 9, wherein at least one of (i) the one or more frequency-domain bitmaps and (ii) the one or more symbols of the time-domain symbol map indicate different frequency-domain configurations for different types of reference signals.

12. The method of claim 9, wherein each respective frequency-domain bitmap of the one or more frequency-domain bitmaps further indicates whether the respective frequency-domain bitmap for each subframe of the one or more subframes applies to one or more of Cell-Specific Reference Signals (CRS) and Channel State Information Reference Signals (CSI-RS).

13. The method of claim 9, wherein receiving the signaling message includes receiving the signaling message over one of a dedicated channel associated with a carrier and a broadcast channel.

14. A network element comprising:
a processor configured to,
determine which of a plurality of physical resource elements associated with a physical resource block are to include a reference signal such that a variable number or combination of one or more physical resource elements of the physical resource block are determined from any of the plurality of physical resource elements—to include the reference signal without any restriction on a position of the one or more physical resource elements within the physical resource block, generate a signaling message including information indicating the variable number or combination of the one or more physical resource elements of the physical resource block that are determined from the plurality of physical resource elements to include the reference signal, wherein the signaling message includes, one or more frequency-domain bitmaps corresponding to the physical resource block and indicating which of the plurality of physical resource elements associated with the physical resource block will contain the reference signal, and a time-domain symbol map including one or more symbols corresponding to one or more subframes and indicating (i) which of the one or more subframes will contain the reference signal, and (ii) which frequency-domain bitmap of the one or more frequency-domain bitmaps is applicable in each subframe of the one or more subframes, and transmit the signaling message to at least one user equipment to inform the at least one user equipment as to which of the plurality of physical resource elements associated with the physical resource block will contain the reference signal.

15. A user equipment comprising:

a processor configured to, receive a signaling message including information indicating which of a plurality of physical resource elements associated with a physical resource block are to include a reference signal, wherein a variable number or combination of one or more physical resource elements of the physical resource block are determined from any of the plurality of physical resource elements to include the reference signal without any restriction on a position of the one or more physical resource elements within the physical resource block, wherein the signaling message includes, one or more frequency-domain bitmaps corresponding to the physical resource block and indicating which of the plurality of physical resource elements associated with the physical resource block will contain the reference signal, and a time-domain symbol map including one or more symbols corresponding to one or more subframes and indicating (i) which of the one or more subframes will contain the reference signal, and (ii) which frequency-domain bitmap of the one or more frequency-domain bitmaps is applicable in each subframe of the one or more subframes, determine the variable number or combination of the one or more physical resource elements that will contain the reference signal based on the signaling message; and use the reference signal contained in at least one of the one or more physical resource elements for at least one of detection, synchronization and one or more measurements of a carrier.

* * * * *